Dec. 16, 1969     L. M. AUSTIN ET AL     3,484,328
TELESCOPE MIRROR BLANK

Filed July 1, 1965     5 Sheets-Sheet 1

INVENTORS
LEWIS M. AUSTIN
ROBERT R. DENMAN
THOMAS P. O'DONNELL
FRANK VERES
BY W. A. Schach and
Claron N. White
ATTORNEYS Dec. 16, 1969

L. M. AUSTIN ET AL 3,484,328

TELESCOPE MIRROR BLANK

Filed July 1, 1965

INVENTORS
LEWIS M. AUSTIN
ROBERT R. DENMAN
THOMAS P. O'DONNELL
FRANK VERES

BY

ATTORNEYS

Dec. 16, 1969   L. M. AUSTIN ET AL   3,484,328
TELESCOPE MIRROR BLANK

Filed July 1, 1965   5 Sheets-Sheet 4

INVENTORS
LEWIS M. AUSTIN
ROBERT R. DENMAN
THOMAS P. O'DONNELL
FRANK VERES

BY

ATTORNEYS

Dec. 16, 1969   L. M. AUSTIN ET AL   3,484,328
TELESCOPE MIRROR BLANK

Filed July 1, 1965   5 Sheets-Sheet 5

INVENTORS
LEWIS M. AUSTIN
ROBERT R. DENMAN
THOMAS P. O'DONNELL
FRANK VERES
BY

ATTORNEYS

United States Patent Office 3,484,328
Patented Dec. 16, 1969

3,484,328
TELESCOPE MIRROR BLANK
Lewis M. Austin, Robert R. Denman, Thomas P. O'Donnell, and Frank Veres, Toledo, Ohio, assignors to Owens-Illinois, Inc., a corporation of Ohio
Continuation-in-part of application Ser. No. 437,431, Mar. 5, 1965. This application July 1, 1965, Ser. No. 468,691
Int. Cl. G02b 23/02
U.S. Cl. 161—4
13 Claims

ABSTRACT OF THE DISCLOSURE

One-piece, light-weight, transparent telescope mirror blanks consisting essentially of one integral shaped mass of transparent, low-expansion, at least partially crystallized glass ceramic having a pair of oppositely disposed face surfaces and a plurality of separate cavities between the face surfaces. One of the face surfaces of the mirror blank has a plurality of openings therein, each of the openings being in communication with a cavity. The cross-sectional area of the opening is smaller than the cross-sectional area of the cavity. Telescope mirrors can be made by coating the surface of the mirror blank with an appropriate reflecting coating. Methods of making the mirror blank and mirror are also disclosed as well as apparatus.

This is a continuation-in-part of application Ser. No. 437,431 filed Mar. 5, 1965 now abandoned.

This invention relates to a telescope mirror blank and telescope mirror made therefrom, and, more particularly, to a one-piece light-weight, transparent, low-expansion telescope mirror blank, to a process for making the same, and to the light-weight telescope mirror made therefrom.

Telescope mirror blanks of large diameters and thicknesses present special and difficult problems in the casting thereof and, after the reflecting surface has been carefully ground, polished, figured, and coated, in the subsequent handling and mounting of these mirrors in the telescopes. Due to the enormous weight of the larger mirrors, complex mounting means must be utilized for supporting the mirror in the telescope, care being taken to assure that the mirror is always in strain-free condition, irrespective of its position as the telescope is moved to observe different areas of the sky.

Since the condition and configuration of the reflecting surface of the finished mirror determines the accuracy of the reflected image, and since the mirror must be of sufficient rigidity so as to prevent even the slightest movement or distortion of the reflecting mirror surface, the thickness of the mirror must be substantial in order to insure such rigidity. Attempts have been made in the past to lighten the overall weight of such telescope mirrors by forming a mirror blank of a minimum thickness and then subsequently bonding the undersurface of the mirror blank to glass members of the same composition, which members, as a whole, impart a certain rigidity to the ultimate reflecting mirror.

One example of this is the use of an "egg-crate" construction wherein a plurality of elongated glass strips having spaced slotted portions along one longitudinally extending edge are interconnected with a purality of similar glass strips extending at right angles thereto, the connection being at the respective slotted portions so that the final structure is of the same thickness or height as the individual strip, just as in the case of the interconnected cardboard members used with an egg crate to separate the individual eggs. However, due to the overall size of the glass strips and the thickness of the mirror blank, considerable problems occur when the glass strips are subjected to temperatures sufficient to fuse them together along adjoining portions and also fuse the upper surface of the interlocking "egg-crate" structure to the bottom surface of the mirror blank. A glass back-up plate of sufficient thickness to impart rigidity to the mirror must also be fused to the other surface of the "egg-crate" structure. Since the casting of large mirrors is a very delicate operation, and the temperature to which the glass is subjected as it is being cooled has to be very carefully controlled, it will be apparent that serious problems occur as soon as an attempt is made to fuse to the "egg-crate" glass structure the bottom surface of the glass mirror blank and to the back-up plate. To do this successfully is a tedious, time-consuming operation which adds considerably to the cost of the final product.

Accordingly, it is an object of this invention to provide a process for forming a one-piece light-weight, reflecting, vitreous mirror for a telescope, which process avoids the disadvantages which exist in the prior art.

It is another object of this invention to provide a one-piece light-weight, low-expansion, vitreous telescope mirror blank wherein the surface of the blank can be ground, polished, figured and coated, whereby the resulting mirror, when mounted within a telescope, is of a rigidity sufficient to prevent any distortion of the reflecting surface.

Another object of this invention is to provide a light-weight, transparent, low-expansion, thermally crystallized glass-ceramic telescope mirror blank having a low lineal coefficient of thermal expansion.

Still another object of this invention is to provide a one-piece light-weight low expansion vitreous telescope mirror blank having a plurality of separate cavities disposed throughout its interior, each cavity communicating to the atmosphere through small openings in the mirror blank surface, the volume of these cavities being such that the overall weight of the mirror blank, and mirror which is made therefrom, is considerably reduced.

Still another object of this invention is to provide a process for making a one-piece, light-weight, transparent thermally crystallized glass-ceramic telescope mirror blank having a low coefficient of lineal thermal expansion wherein the mirror blank has a plurality of separate cavities disposed throughout its interior and communicating to the atmosphere through small openings in one surface of said blank, the volume of these cavities being such that the overall weight of said mirror blank is considered reduced.

Still another object of this invention is to provide a process for making a light-weight, low-expansion, telescope mirror blank of substantial thickness and diameter, which may be readily cast and heat treated to the desired degree in a minimum length of time and at a relatively low cost.

In attaining these objects, one feature resides in forming a vitreous mirror blank having a pair of oppositely disposed face surfaces and a plurality of separate cavities disposed between the surfaces. One of the surfaces is provided with a plurality of openings, each of which is disposed above or opposite one of the cavities and communicates with the cavity. Each opening is considerably smaller in cross-sectional area than the cross-sectional area of the cavity.

Another feature resides in forming a transparent glass ceramic telescope mirror blank by maintaining a molten thermally crystallizable glass within a zone, which glass is preferably of the $SiO_2$—$Al_2O_3$—$Li_2O$ system, maintaining a plurality of shaped modules, each of which has a support member affixed thereto, in the molten zone, and having each of the modules being completely immersed in the molten glass. By increasing the viscosity of the glass until it is self-supporting, removing the self-supporting glass from the zone and subjecting it to a particular heat treatment until the glass is thermally crystallized in situ, a low expansion transparent telescope mirror blank is produced containing as predominant crystalline phases lithium-containing crystalline phases, either as beta-eucryptite or beta-eucryptite-like crystals, or as beta-spodumene or beta-spodumene-like crystals, or both, as indicated by X-ray diffraction data. A multitude of such crystalline phases in random orientation and dispersed in the glassy matrix remaining as a result of in situ crystallization are to be found in the glass-ceramic mirror blank of the invention. Substantially all of the crystals of the glass-ceramic are of a diameter less than $\frac{1}{3}$ micron measured along the largest lineal dimension of the crystals. Upon removal of the modules from the interior of the blank, a plurality of cavities are formed therein.

Still another feature of this invention is to form a light-weight, transparent, glass-ceramic telescope mirror blank wherein the blank has a coefficient of lineal thermal expansion of from minus $10 \times 10^{-7}$ to $10 \times 10^{-7}$ per ° C. (0–300° C.) and preferably of about zero, depending upon the composition and the heat treatment to which it is subjected.

Other objects, features and advantages of the invention will become more apparent from the following discussion of the invention, taken in conjunction with the drawings, wherein.

In practicing the invention, the mirror blank may be formed by pouring a molten vitreous mass 9 into an annular mold 10 which is provided with a plurality of upwardly extending pins 11 fastened to the base 12 of the mold.

Figure 1:
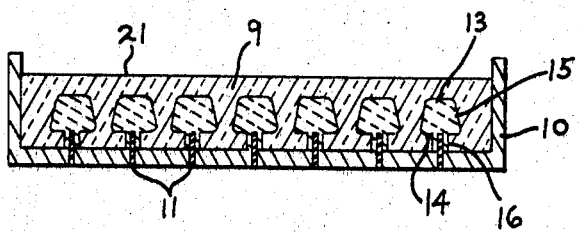
FIG. 1 is a cross-sectional view of one portion of the telescope mirror blank of the present invention, shown cast in a mold and having the modules present within the blank.

Removably secured to each pin is a shaped module or cavity-forming unit 13 having a shoulder portion 14 and a body portion 15. As shown in FIG. 1, the module has a neck portion 16 integral with the shoulder 14 and removably disposed about pin 11 so that the neck portion 16 completely shields pin 11 from the molten vitreous mass 9.

The shaped module can be of any material which is resistant to the high temperature of the molten glass and which retains its shape during the subsequent heat treatment process. The material should be of a type which has a low coefficient of expansion and which can be readily removed from the interior of the mirror blank after the blank is formed. One of many suitable materials for this purpose is a shaped, open cell type amorphous fused silica foam formed by slip casting the silica in plaster molds to the desired shape. Suitable shaped modules can be formed by utilizing the aforesaid silica which is sold under the trademark "Glasrock Foam No. 25" by Glasrock Products, Inc. of Atlanta, Ga. The amorphous silica which is at least 98% pure silica with $Al_2O_3$ being the major impurity, has a linear coefficient of thermal expansion of $0.54 \times 10^{-6}$ per ° C. (0–1000° C.) and can withstand thermal shocks of up to 3100° F. The bulk density is between 23 and 28 lbs./cu. ft.

Figure 2:
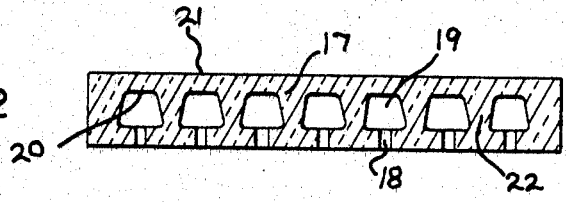
FIG. 2 is a cross-sectional view of the one-piece telescope mirror blank of the present invention showing the plurality of cavities therein.
Figure 3:
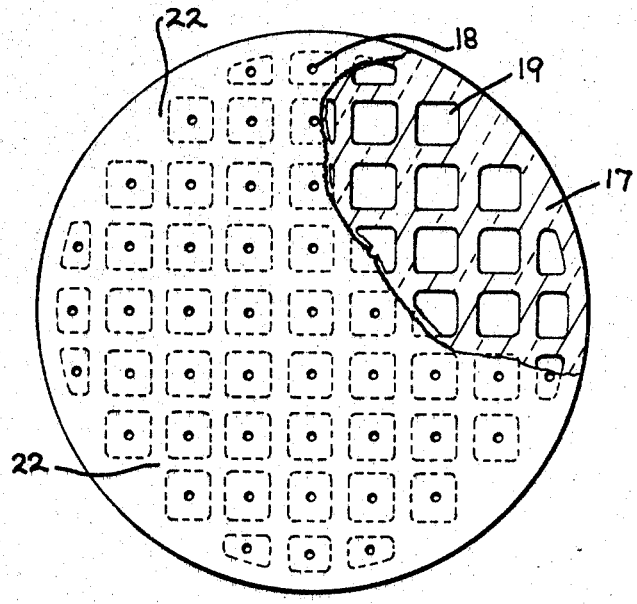
FIG. 3 is an enlarged plan view of the underside of the annular telescope mirror blank of the invention illustrated in FIG. 1 showing the plurality of openings disposed above the individual cavities, and showing the cavities in the broken-away portion of the mirror.
Figure 4:
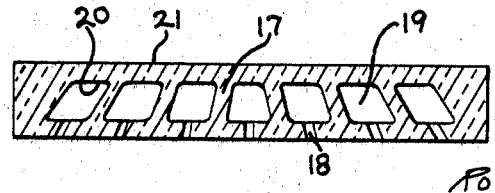
FIG. 4 is a cross-sectional view of another embodiment of the telescope mirror blank of the present invention.

After the vitreous mirror blank 17 of the invention has been cast, removed from the mold 10, subjected to a prescribed heat treatment and subsequently cooled to ambient temperature, the shaped modules 13 can be readily removed from the interior of the blank through the openings 18 on the underside of the mirror blank by chipping them with a suitable tool. A mirror blank 17 having a plurality of cavities 19 is thus obtained, as illustrated in FIGS. 2 and 3. FIG. 4 illustrates another embodiment of the present invention wherein the cavities 19 can be of different shapes, depending upon the configuration of the shaped modules utilized in casting the mirror blank. In the preferred embodiments, the bottom surfaces 20 of each of cavities 19 are equally spaced from the surface 21 of the mirror blank 17, which surface 21 eventually becomes the reflecting surface of the telescope mirror. Due to the symmetrical arrangement of the shaped modules in the mold, the resulting mirror blank as shown in FIG. 3 has a plurality of spaced cavities in parallel rows forming a series of ribs 22 extending in two directions, the thickness of the rib portions at the elevation where openings 18 communicate with cavities 19 preferably being less than distance between cavities 19 and surface 21 that will be mirrored.

Figure 5:
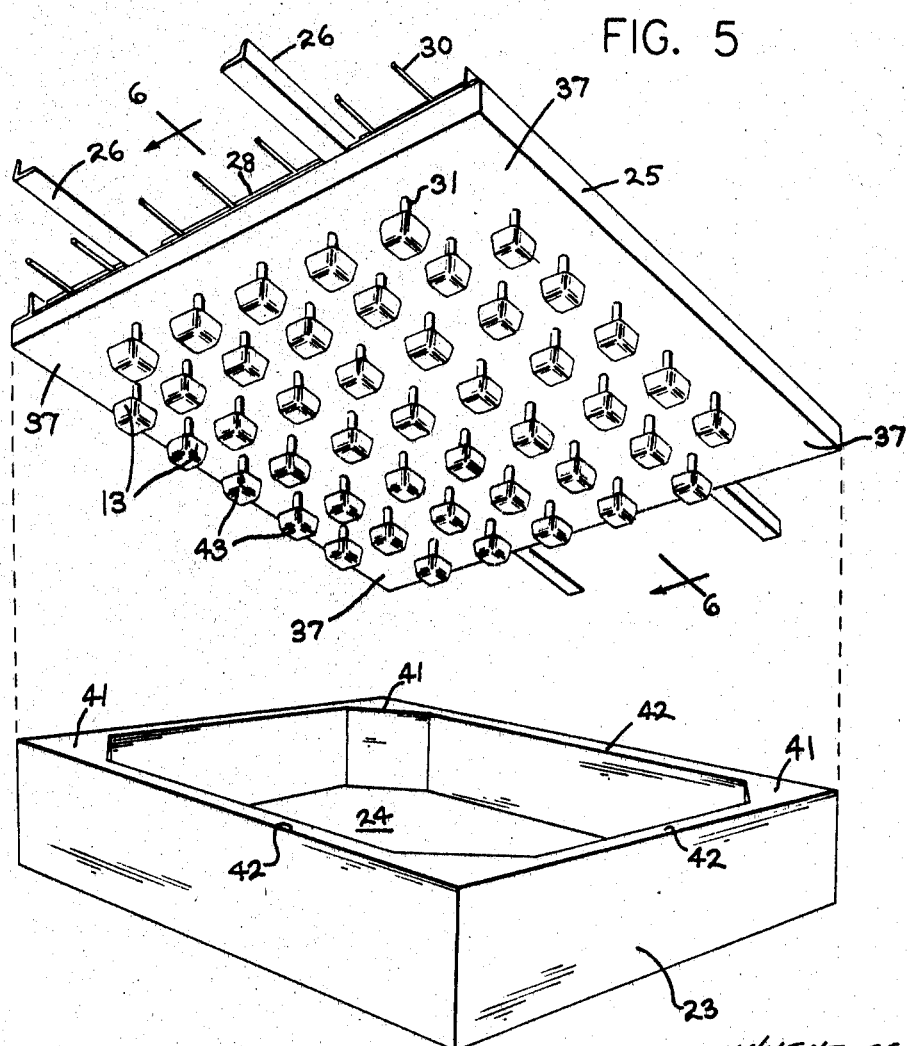
FIG. 5 is a perspective view of one form of apparatus which can be utilized in making the telescope mirror blank of the present invention.

As illustrated in FIG. 5, a mold 23 having an octagonal inner configuration may be utilized for casting the vitreous blank. The bottom surface 24 of the mold 23 may be flat or, preferably, may be of convex configuration so as to impart a concave surface on the bottom of the vitreous mass cast therein. Disposed above mold 23 is a module-holding plate 25 having a pair of angle irons 26 secured to its upper surface 27 and extending outwardly beyond the edges, thus permitting manual lifting and lowering of the plate 25 relative to mold 23. A plurality of angle irons 28 are also secured (by means not shown) to the upper surface 27 of plate 25 and extend at right angles to angle irons 26. Each of angle irons 28 has a plurality of openings 29 therethrough (see FIG. 7) and the openings 29 are aligned so as to receive rods 30 extending therethrough.

Figure 7:
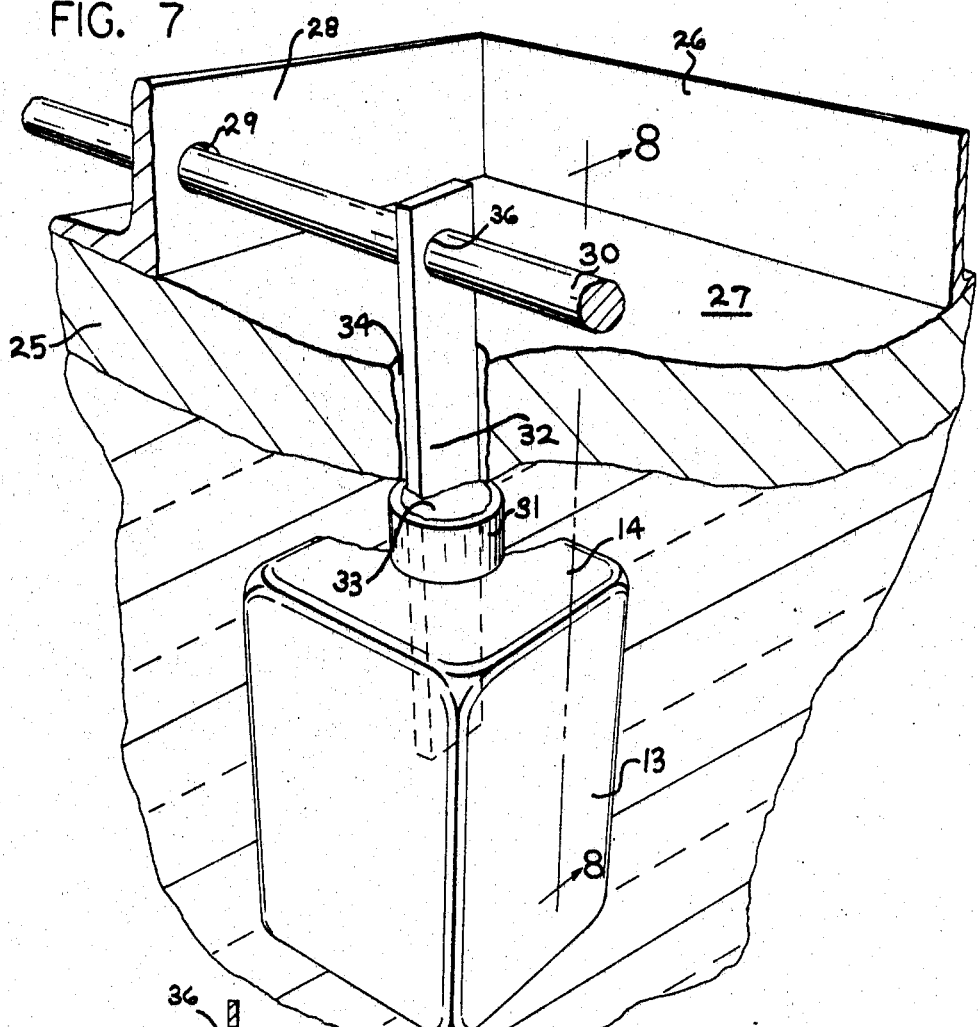
FIG. 7 is a fragmentary section of a mold of the type illustrated in FIG. 6 and showing a perspective view of a module supported within the molten glass.

As more readily seen in FIG. 7, each of the shaped modules 13 has an annular metal ring 31 on shoulder 14 and surrounding an elongated support member 32 which extends inwardly into module 13. Member 32 and ring 31 are secured to the shoulder 14 of module 13 by a suitable adhesive or cement 33, such as sauereisen. Support member 32 extends upwardly through an opening 34 in plate 25 and the upper end 35 has an opening 36 through which rod 30 extends. The support members 32 are so affixed into modules 13 that the rings 31 are in contact with the under surface 37 of plate 25 so that no molten glass is permitted to come into contact with support member 32.

Figure 9:
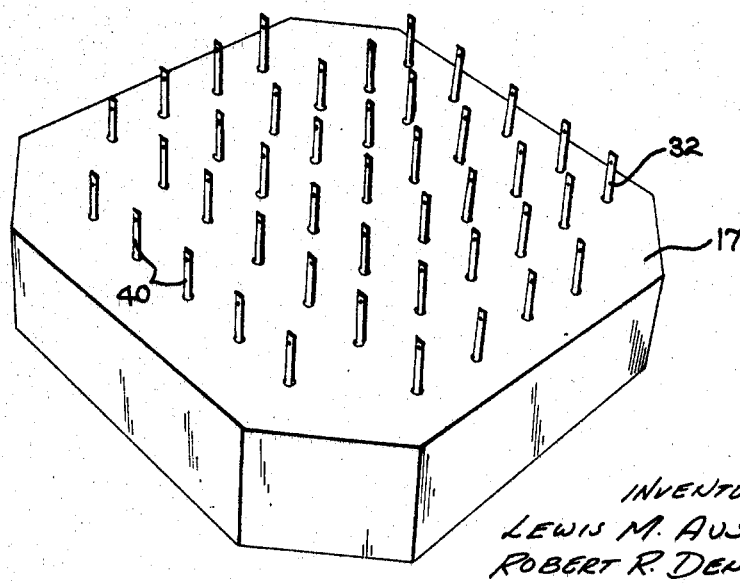
FIG. 9 is a perspective view of another embodiment of the telescope mirror blank of the present invention showing the support members still affixed to the modules disposed within the interior of the blank.

In utilizing the apparatus of FIG. 5, a molten vitreous mass is first poured into mold 23 to a predetermined level. Plate 25 containing the plurality of suspended modules is then lowered until the corners and edges of under surface 37 rest upon the corners 41 and edges 42 of mold 23. Modules 13 are thus immersed within the molten vitreous mass and as soon as the viscosity of the mass is increased to a point where the mass is self-supporting, the rods 30 are pulled out of openings 36 in support member 32, thus permitting plate 25 to be lifted from mold 23. All of support members 32 remain secured to the modules 13 within the vitreous mass, as shown in FIG. 9, where the vitreous mass is shown removed from the mold. The mass then undergoes a heat treatment, the temperatures and times of which are governed by the composition of the mass and the ultimate properties which are desired.

When the resulting mirror blank 17 is finally at ambient temperature, the cement 33 holding each of the support members 32 and rings 31 is removed, members 32 and rings 31 are lifted out and the modules 13 chipped away through the opening 40 remaining in the upper surface of the blank until only the cavities remain in the mirror blank. Since the modules 13 supported in plate 25 are of the same height, the flat bottom portions 43 are maintained equally distant from the bottom surface 24 of mold 23, thus assuring that the thickness of the mirror blank from the bottom 20 of the resulting cavities to the outer surface 21 is substantially the same throughout the blank (see FIG. 2).

Figure 6:
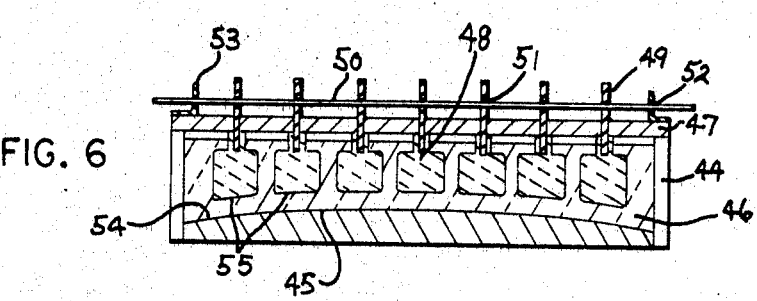
FIG. 6 is a cross-sectional view of a mold of the type illustrated in FIG. 5 shown in a closed position with the individual modules supported within the molten glass.

FIG. 6 illustrates another embodiment of the apparatus of FIG. 5 wherein a split ring mold 44 having an independent convex bottom surface 45, after it has been filled to a predetermined level with a molten vitreous mass 46, has plate 47 lowered thereon so that shaped modules 48 are suspended within the vitreous mass. As previously discussed with respect to FIGS. 5 and 7, the modules 48 are supported by members 49 extending therein and, in turn, supported by rod 50 passing through openings 51 in members 49 and through openings 52 in angle irons 53. In view of the concave configuration which is imparted to surface 54 of the mass 46, the bottom surfaces 55 of the modules are likewise of the same configuration so that all of bottom surfaces 55 lie in a plane which is substantially parallel to concave surface 54 and convex mold surface 45.

Figure 10:
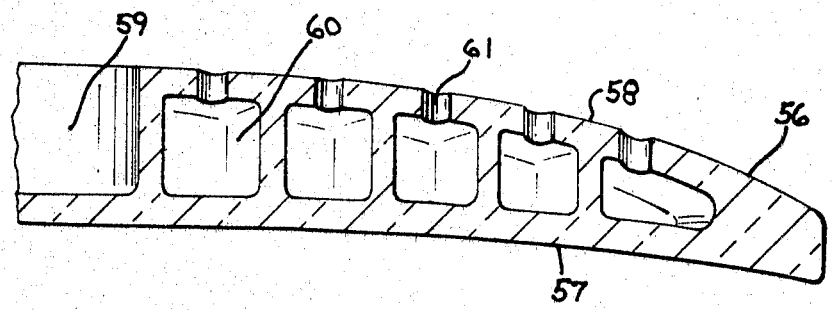
FIG. 10 is a fragmentary cross-sectional view of still another embodiment of the telescope mirror blank of the present invention.

In still another embodiment of the present invention illustrated in FIG. 10, mirror blank 56 is formed with a concave reflecting surface 57 and a convex back surface 58. This is accomplished by utilizing modules of varying shapes suspended from an upper plate similar to plate 47 shown in FIG. 6 except that its bottom surface is of concave configuration and snugly fits within the mold, defining a zone corresponding to the outer configuration of blank 56.

Mirror blank 56 is also formed with a centrally disposed cavity 59 which can be of any desired configuration so as to receive mounting means (not shown) therein, thus permitting mounting of the mirror formed from the blank in the manner of a radio or radar antenna. By having the cavities 60 of varying sizes and shapes, the mirror blank which is formed has a plurality of radially extending ribs 62 which are of the same thickness as the glass blank and impart rigidity thereto. By making the mirror blank of the configuration shown in FIG. 10, the overall weight of the mirror formed therefrom is greatly decreased due to the progressive reduction in the thickness of the peripheral portions thereof relative to its center portion. Again, openings 61 disposed opposite the cavities 60 and communicating therewith, permit the cavities to remain at atmospheric pressures and temperatures.

The following example is merely illustrative of an embodiment of the invention, and it is to be understood that the scope of the invention is not to be considered limited in any manner thereby.

EXAMPLE I

Figure 8:
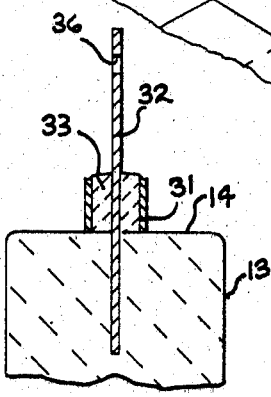
FIG. 8 is a cross-sectional view of the upper portion of the module taken along lines 8—8 of FIG. 7.
Figure 11:
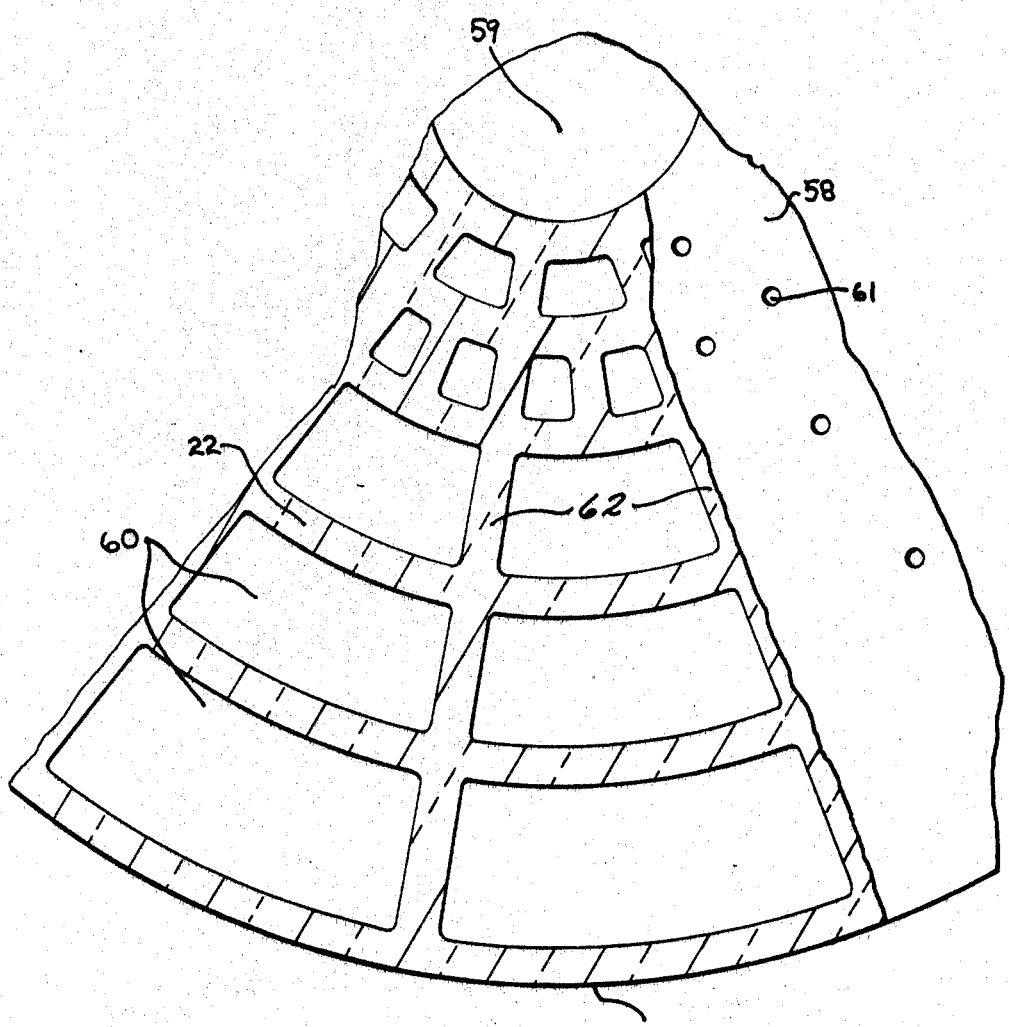
FIG. 11 is a fragmentary plan view of the embodiment illustrated in FIG. 10 wherein a portion of the upper surface is shown removed to further illustrate the cavities formed therein.

A thermally crystallizable molten glass having a temperature within the range of 2650–2750° F. was poured into a split-ring graphite mold having a convex bottom surface, which mold had been preheated to 400° F. The mold being 16″ in diameter, it took approximately 15 seconds to pour the molten glass therein to the desired depth. As soon as the glass flow stopped, the upper plate of the mold having a symmetrical arrangement of a plurality of shaped Glasrock modules of the configuration shown in FIG. 8 suspended from its bottom surface was lowered onto the mold so that all of the modules were immersed below the molten glass surface in the manner shown in FIG. 6. The modules had been previously heated to about 800° F. prior to their immersion into the molten glass. After 5 seconds had elapsed from the immersion of the modules, the rods supporting the modules were removed from the plate and the plate lifted from the mold. As soon as the viscosity of the glass increased to a point where the glass was self-supporting, the split-ring mold was opened and the glass assembly was supported by the convex bottom surface of the mold. A total time of about 2½ to 3 minutes had elapsed from the time the glass had first been poured into the mold.

The self-supporting glass assembly together with the mold bottom was promptly placed into an oven which had been preheated to a temperature of 1000° F. and whose temperature was increased to 1150° F. due to the presence of the hot assembly therein, and the assembly was maintained in the oven for a period of three hours at this temperature.

The temperature in the oven was then increased to 1350° F. at the rate of about 5° F. per minute, and the assembly maintained therein for 50 hours at this temperature. At the end of this time, the assembly was cooled at the rate of 1° F. per minute until the temperature of 1000° F. was reached, and then the cooling rate was increased to slightly less than 5° F. per minute until room temperature was reached. A transparent thermally in situ crystallized glass-ceramic mirror blank 3½ inches thick was formed. After the support members had been removed and the Glasrock modules chipped and scraped away, the mirror blank had a plurality of cavities disposed throughout its inner portion. It had a coefficient of lineal thermal expansion of zero $\pm 1 \times 10^{-7}$ per ° C. (0–300° C.).

EXAMPLE II

A mirror blank was formed by pouring a thermally crystallizable molten glass having a temperature of about 2700° F. into a graphite mold which had been preheated to a temperature such as to minimize any heat loss by the glass. The mold was 16″ in diameter and had a plurality of Glasrock modules supported thereon in the manner shown in FIG. 1. It took about 15–20 seconds to pour the molten glass into the mold about the shaped, open cell type amorphous fused silica foam modules to a depth of one-half inch above the tops of the preheated modules. The molten glass was permitted to remain in the mold for about 4 minutes, at which time the viscosity of the glass had increased to a point where the glass was self-supporting.

The mold was then inverted and the glass blank was placed on a transite surface which was promptly placed into an oven preheated to a temperature of 1000° F. and whose temperature was increased to 1150° F. due to the presence of the hot assembly therein. The assembly was maintained in the oven for a period of three hours at this temperature. The oven temperature was then increased to 1350° F. at the rate of about 5° F. per minute and the assembly maintained therein for 50 hours at this temperature. At the end of this time, the assembly was cooled at the rate of 1° F. per minute until the temperature of 1000° F. was reached, and then the cooling rate was increased to slightly less than 5° F. per minute until ambient temperature was reached.

A transparent, thermally in situ crystallized glass-ceramic mirror blank was formed. The fused silica modules were chipped and scraped away from the blank resulting in a plurality of cavities disposed throughout the inner surface and conforming to the shape of the modules.

The thermally crystallizable glass used in the foregoing examples, which produced a thermally, in situ, crystallized transparent glass-ceramic telescope mirror blank was prepared by first melting together the following batch ingredients expressed in pounds and ounces:

| Ingredient: | Parts |
|---|---|
| Petalite [1] | 405 lbs., 14 oz. |
| Zircon sand [2] | 15 lbs., 2.5 oz. |
| Alumina [3] | 39 lbs., 1 oz. |
| Boric acid [4] | 30 lbs., 5 oz. |
| High-calcium limestone [5] | 24 lbs., 8.5 oz. |
| Zinc oxide | 6 lbs., 5 oz. |
| Lithium carbonate | 5 lbs., 5 oz. |
| Titanium dioxide [6] | 9 lbs., 1.5 oz. |
| Niter | 1 lb., 4 oz. |
| Sodium antimonate | 1 lb., 11 oz. |

[1] 4.2% $Li_2O$, 16.1% $Al_2O_3$, 77.7% $SiO_2$, 0.4% $Na_2O$, 0.027% $Fe_2O_3$, and other minor ingredients, including ignition loss.
[2] Analysis of zircon sand is 33.8% $SiO_2$, 65.5% $ZrO_2$, 0.12% $TiO_2$, 0.05% $Fe_2O_3$, 0.24% $Al_2O_3$, and 0.2% cerium oxide and possibly rare earth oxide.
[3] Weight of Alcoa A–14 alumina which is illustratively 99.5% $Al_2O_3$, 0.03% $Fe_2O_3$, 0.10% $Na_2O$, 0.08% $SiO_2$, 0.2% ignition loss at 1100° C.
[4] 56.2% $B_2O_3$.
[5] Limestone analyzing 55.25% CaO, 0.25% MgO, 0.5% $SiO_2$, 0.2% $Al_2O_3$, 0.05% $Fe_2O_3$, 0.001% $Cr_2O_3$, 0.03% sulfate ($SO_3$), 0.02% $P_2O_5$ and an ignition loss of 43.6%.
[6] Weight of Titanox-GM which is a non-pigmentary grade of substantially pure $TiO_2$ sold by Titanium Pigment Corporation.

This glass has the following theoretical composition and for an actual tank batch had the following analyzed composition, expressed as various oxides in weight percent:

| | Theoretical, percent | Analyzed, percent |
|---|---|---|
| $SiO_2$ | 64.0 | 63.7 |
| $Al_2O_3$ | 20.9 | 21.4 |
| CaO | 2.7 | 2.8 |
| ZnO | 1.3 | 0.98 |
| $Li_2O$ | 3.9 | 3.80 |
| $B_2O_3$ | 3.4 | 2.96 |
| $TiO_2$ | 1.8 | 1.91 |
| $ZrO_2$ | 2.0 | 1.98 |
| $K_2O$ | 0.2 | 0.18 |
| $Na_2O$ | | 0.65 |
| $Sb_2O_3$ | 0.4 | 0.32 |

The differences between theoretical and actual compositions are believed to be due primarily to alumina pick-up from the refractory of the furnace and to $B_2O_3$ and ZnO losses by volatilization.

Based upon the heat treatment, as described above, that is given to this glass the glass-ceramic obtained should have a thermal coefficient of expansion of minus $0.2 \times 10^{-7}$ per ° C. (0–300° C.).

Another example of a preferred thermally crystallizable glass which by suitable heat treatment as described below can produce an astronomical telescope mirror blank of glass-ceramic with a thermal coefficient of expansion of $0 \times 10^{-7}$ per ° C. (0–300° C.) is described below. The heat treatment for this glass differs from that described above in that the temperature of the oven in which the molded glass is placed after the maintenance at 1150° F. for a period of three hours is raised to 1425° F. at the rate of about 5° F. per minute, instead of 1350° F., and is maintained at 1425° F. for 48 hours. Otherwise, the process is that described above for Examples I and II.

This glass is prepared by first melting together the following batch ingredients expressed in parts by weight:

| Ingredient: | Parts |
|---|---|
| Petalite [1] | 427 lbs., 14 oz. |
| Zircon sand [2] | 15 lbs., 2 oz. |
| Alumina [3] | 35 lbs., 8 oz. |
| High-calcium limestone [4] | 24 lbs., 9 oz. |
| Zinc oxide | 6 lbs., 5 oz. |
| Lithium chloride | 2 lbs., 9 oz. |
| Lithium nitrate | 1 lb., 7 oz. |
| Titanium dioxide [5] | 9 lbs., 2 oz. |
| Sodium antimonate | 2 lbs., 8 oz. |

[1] Petalite composition is as described above following the tabulation of batch ingredients for the other glass described in detail.
[2] Zircon sand is also as described earlier.
[3] Weight of Alcoa A–14 alumina which is illustratively 99.6% $Al_2O_3$, 0.03% $Fe_2O_3$, 0.04% $Na_2O$, 0.12% $SiO_2$, 0.2% ignition loss at 1100° C.
[4] Limestone is also as described above.
[5] Weight of Titanox-GM which is also described above.

This glass has the following theoretical composition and for an actual tank batch had the following analyzed composition, expressed as various oxides and one chemical element in weight percent:

| | Theoretical, percent | Analyzed, percent |
|---|---|---|
| $SiO_2$ | 67.4 | 67.5 |
| $Al_2O_3$ | 20.9 | 22.1 |
| CaO | 2.7 | 2.6 |
| ZnO | 1.3 | 0.5 |
| $Li_2O$ | 3.9 | 3.59 |
| $TiO_2$ | 1.8 | 1.9 |
| $ZrO_2$ | 2.0 | 1.95 |
| $Na_2O$ | 0.5 | 0.80 |
| Cl | 0.2 | (*) |
| $Sb_2O_3$ | 0.4 | (*) |

*Not analyzed.

The differences are believed to be due to alumina pick-up and volatilization loss in the case of ZnO.

While telescope mirror blanks of the present invention may be formed utilizing known vitreous compositions which have been shown to be suitable for telescope mirrors in the past, such as fused quartz, borosilicate glass, and the like, it is preferred to utilize thermally crystallizable glasses of the $SiO_2$–$Al_2O_3$–$Li_2O$ system, capable of being thermally, in situ crystallized to form transparent glass-ceramics having a coefficient of lineal thermal expansion which is low and preferably is about zero.

Transparent, low-expansion, glass ceramic telescope mirror blanks may be formed by thermal in situ crystallization of the preferred thermally crystallizable base glass composition of the present invention, which composition consists essentially of the following components, in the indicated percent limits, based on the total glass composition.

| Component: | Weight percent |
|---|---|
| $SiO_2$ | 56–58 |
| $Al_2O_3$ | 18–27 |
| $Li_2O$ | 3.4–4.5 |
| CaO | 0–3 |
| ZnO | 0–2 |
| $B_2O_3$ | 0–4 |
| $TiO_2$ | 0–6 |
| $ZrO_2$ | 0–3 |
| MgO | 0–3 |
| $Na_2O$ | 0–1 |
| $P_2O_5$ | 0–3 |
| ($SiO_2$+$Al_2O_3$) | $\leq 82$ |
| ($SiO_2$+$Al_2O_3$+$B_2O_3$+$P_2O_5$) | 86–91 |
| (CaO+MgO+ZnO+$Na_2O$) | 2.5–6 |
| ($SiO_2$+$Al_2O_3$+$P_2O_5$+$Li_2O$) | $\geq 93$ |
| ($TiO_2$+$ZrO_2$) | 2–6 | wherein the ratio of (CaO+MgO+$Na_2O$+$B_2O_3$) to $Li_2O$ is less than 2.4 and the ratio of $SiO_2$ to $Al_2O_3$ is no more than 3.8, and preferably no more than 3.3. The $SiO_2$ content may be increased up to 70 weight percent and good results are obtained.

For uses of glasses and crystalline ceramics of the invention that require holding the formed glass objects for an extended time in temperature ranges where crystallization can take place, given long enough time, it has been found that the amount of $TiO_2$ plus $ZrO_2$ should be limited to a maximum of about 3 weight percent and that the $TiO_2$ should be limited to about 1.5 percent of the glass composition set forth herein. Usually the range of $TiO_2$ is from 1 to 1.5 percent in this aspect of the invention. One such use requiring such low nucleant levels is in making very large shaped objects, such as very thick telescope mirror blanks having large diameters, which blanks require a very long annealing time during which the glass must not prematurely crystallize.

The transparent, crystalized glass-ceramic formed, as was formed in Examples I and II above, contains as predominant crystalline species lithium-containing crystalline phases selected from the group consisting of beta-eucryptite or beta-eucryptite-like crystals, or as beta-spodumene or beta-spodumene-like crystals, or both as indicated by X-ray diffraction data. The ceramic contains a multitude of such crystalline species which are in random orientation throughout the ceramic and which are dispersed in the glassy matrix remaining as a result of the in situ crystallization. Substantially all of the crystals of the ceramic are of a diameter less than ⅓ micron measured along the largest lineal dimension of the crystals. The glass-ceramic has a lineal coefficient of thermal expansion of about minus $10 \times 10^{-7}$ to $10 \times 10^{-7}$ (0–300° C.) and, preferably from $-3$ to $3 \times 10^{-7}$ (0–300° C.). The ultimate telescope mirror blank and telescope mirror formed therefrom is one in which the lineal coefficient of thermal expansion of the glass-ceramic is about zero. Furthermore, while the diameter of the crystals within the ceramic is preferably less than ⅓ micron measured along the largest lineal dimension of the crystals, it is preferred that the crystals be of a diameter less than ¼ micron in size, and best results are evident when the diameter is less than ¹⁄₁₀ micron in size.

Other transparent, low-expansion, crystallized glass-ceramics formed by thermal in situ crystallization of a thermally crystallizable base glass are disclosed in copending U.S. application Ser. No. 396,011 filed Sept. 14, 1964 now abandoned, and in copending U.S. application Ser. No. 386,693 filed July 31, 1964, now abandoned, and in the continuation-in-part applications subsequently filed with respect thereto, all applications being assigned to the assignee of the present application. All of the disclosure in the aforesaid applications relating to thermally crystallizable glass compositions and the process of heat treating said compositions to form transparent, low-expansion glass-ceramics of substantial thickness and diameter are incorporated herein by reference. As fully disclosed in the aforesaid pending applications, the final coefficient of thermal expansion of the glass-ceramic is determined by the composition of the thermally crystallizable glass and by the particular heat treatment to which it is subjected.

A mirror blank having a concave surface can be made in accordance with the process disclosed in Example II by inverting the mold containing the hot self-supporting glass onto a convex surface and then permitting the glass to slump thereon and assume the configuration of the supporting surface. It will be appreciated that by making a surface of the blank concave, it will facilitate the grinding, polishing and figuring thereof to the desired configuration.

Furthermore, while graphite molds have been used in making the mirror blanks of the present invention, it is contemplated that the molds may be made of materials such as open cell type amorphous fused silica foam (Glasrock), low-expansion ceramics, and the like which can be preheated to temperatures approaching that of the molten vitreous mass. It is preferred that when mirror blanks are to be made from a thermally crystallizable glass the modules should have rounded corners and edges as shown in FIG. 7. This will minimize or prevent uncontrolled crystallization of the glass occurring at sharp edges or corners. Alternatively, the modules can be annular, conical or of any suitable configuration and do not necessarily have to be rectangular.

It is to be understood, of course, that when lightweight telescope mirror blanks are to be formed from fused quartz, borosilicate or other vitreous composition, the best treatment step will vary from that of Examples I and II above since in situ crystallization of the glass is not necessary. Such heat treatments are those well known in the mirror blank art.

In the foregoing description of embodiments of the present invention, molten vitreous composition is poured into the mold. As an alternative, the mold may be filled with vitreous cullet which is then heated to a temperature sufficient to melt it within the mold.

In the case of making mirror blanks of fused quartz, in accordance with the foregoing teaching of the present invention, a material such as Glasrock would not be suitable. In its place one would use a material such as graphite to make shaped modules 13, 48. To minimize gas bubbles in the blank due to gas evolution, a vacuum can be imposed on the system. As an alternative to vacuum, any gas bubbles can be kept in the bottom of the molten quartz in the mold by using a pressurized system. When making the mirror of quartz, sand is placed in the mold having the cavity-forming projects and melted.

As illustrated in FIG. 7, each shaped module 13 is supported by member 32 having an opening 36. The support member 32 extends up through rigid plate 25 and as described above extends down in module 13. The ring 31 is mounted on module 13 and the space between it and member 32 is filled with an adhesive cement. Instead of these several parts, namely, module 13, support 32, ring 31 and cement 33, it is obvious that the entire shape defined by these assembled components can be provided in the form of a single element, the bottom portion of which provides the shaped module 13, the intermediate portion provides the equivalent of ring 31 (which is really part of the shaped module), and the upper portion of support member 32. This could be made of Glasrock Foam and of course the top part would have an opening through it as in the case of opening 36 in support member 32. The same is true of modules 48 and members 49 which can also be cast in one piece. Accordingly, the cavity-forming members of the apparatus of the present invention, when made of one piece constitute module 13, ring 31, and cement 33. This provides the configuration that is shown in FIG. 6 for module 48 which constitutes such a cavity-forming member. Support 32 and support member 49 extend down into the cavity-forming member with the top portion of the support being utilized to position and maintain the cavity-forming members in a manner shown in FIG. 7, for example.

A transparent, low expansion telescope mirror blank of the present invention, formed by the process disclosed herein, has its base plate surface, which is preferably concave, ground, polished and figured, i.e. a proper parabolic curve is formed on the surface. A thin coating of aluminum is then applied to the prepared surface in a conventional manner to form the reflecting surface.

In the foregoing description of the apparatus of FIG. 5 it is mentioned that plate 25 supporting modules 13 is lowered to press modules 13 into the molten vitreous mass. As an alternative, the apparatus can be modified by having a relatively large opening in plate 25 so that plate 25 supporting modules 13 can be positioned with respect to mold 23 so that modules 13 are at the proper elevation to form cavities in molten glass when the latter is poured or cast through the relatively large opening. This alternative eliminates a glass pressing operation. Instead, the molten glass when poured into the mold flows around modules 13 and rings 31 that are already supported in position by plate 25, when mold 23 is supplied with molten glass in the correct amount by flowing the molten glass through the opening in plate 25.

In a further alternative embodiment, plate 25 can be replaced by a grid support for modules 13 and rings 31. The grid support can be a combination of interlocked rods at a common plane to provide many openings in vertical planes between modules 13. Thus the molten glass can be poured into the mold at many different points to surround modules 13 with molten glass until the height of the top surface of the molten glass is at or near the top of rings 31. Of course, the bottom of modules 13 are spaced from bottom 24 of mold 23 to provide a suitable thickness between the face of the mirror blank formed by bottom 24 and the base of the cavities defined by the bottom of modules 13.

In the foregoing description of the method of the present invention when using a thermally in situ crystallizable glass, the molded glass is cooled in the mold until its viscosity increases sufficiently to be self supporting at its periphery, then it is removed from the mold, cooled further as descrbied and subjected to thermal treatment for the in situ crystallization. Obviously within the scope of the invention, all or part of the mold may be removed at any later time and, likewise, only part of the mold may be removed instead of all of it when the glass upon cooling has increased to the extent that the glass is self supporting at the periphery.

In this specification, as in the above-mentioned pending applications, the terms beta-eucryptite crystals and beta-eucryptite-like crystals have been used in an alternative sense. Thus, while beta-eucryptite is often thought of as the species crystal having one mole of lithia, one mole of alumina and 2 moles of silica, both terms are used in this application to designate crystalline species having the beta-eucryptite structure, as shown by X-ray diffraction, but the peaks can be shifted slightly depending upon whether there is a definite amount of silica present other than exactly 2 moles, either more or less silica than the 2 moles. Similarly, the terms beta-spodumene crystals and beta-spodumene-like crystals are used alternatively and in a generic sense, specifying crystalline species that have the crystalline structure of beta-spodumene that contains 4 moles of silica to one of alumina and one of lithia, but with the peaks shifted somewhat when the crystalline structure contains more or less than 4 moles of silica. In the claims, therefore, the terms beta-eucryptite and beta-spodumene are each used in this generic sense.

While the invention has been discussed in terms of telescope mirror blanks it will be apparent that other large shaped glass objects or articles can be formed by the processes of the invention, particularly where it is important that such objects or articles be of light weight. Such articles, for example, can be used as structural units, including building blocks, panels, etc., in the building and construction industry.

Various modifications of the present invention will be apparent to those skilled in the art. The foregoing description and examples are merely illustrative and the invention will be limited only by the claims that follow.

Having described the invention, what is claimed is:

1. A one-piece, lightweight telescope mirror blank consisting essentially of one integral shaped mass of transparent, low-expansion, at least partially crystallized glass-ceramic, said mirror blank having a pair of oppositely disposed face surfaces and a plurality of separate cavities disposed between said surfaces, the volume between adjacent cavities being occupied by the mass of said at least partially crystallized glass ceramic, one of said face surfaces being provided with a plurality of openings, each of said openings being disposed above and communicating with one of said cavities, each of said openings being smaller in cross-sectional area than the cross-sectional area of said cavity, each of said cavities being provided with one of said openings.

2. A one-piece, lightweight telescope mirror blank as defined in claim 1 wherein the coefficient of lineal thermal expansion of the mirror blank is from about minus $3 \times 10^{-7}$ to about $+3 \times 10^{-7}/°$ C. (0–300° C.).

3. The mirror blank as defined in claim 1 wherein the blank is a thermally in situ crystallized glass-ceramic having a coefficient of lineal thermal expansion of zero $\pm 1 \times 10^{-7}/°$ C. (0–300° C.).

4. The mirror blank as defined in claim 3 wherein the arrangement of, including spacing, and the dimensions of the cavities provide maximum light weighting consistent with adequate rigidity and all corners of the cavities are rounded.

5. The one-piece, light-weight telescope mirror blank as defined in claim 1 wherein said glass-ceramic mirror blank was formed from a thermally crystallizable glass by thermal in situ crystallization, said thermally crystallizable glass having a composition consisting essentially of the following components present in the glass in the following weight percent ranges:

| Component: | Weight percent |
|---|---|
| $SiO_2$ | 56–68. |
| $Al_2O_3$ | 18–27. |
| $Li_2O$ | 3.4–4.5. |
| $CaO$ | 0–3. |
| $ZnO$ | 0–2. |
| $B_2O_3$ | 0–4. |
| $TiO_2$ | 0–6. |
| $ZrO_2$ | 0–3. |
| $MgO$ | 0–3. |
| $Na_2O$ | 0–1. |
| $P_2O_5$ | 0–3. |
| $(SiO_2+Al_2O_3)$ | At least 82. |
| $(SiO_2+Al_2O_3+B_2O_3+P_2O_5)$ | 86–91. |
| $(CaO+MgO+ZnO+Na_2O)$ | 2.5–6. |
| $(SiO_2+Al_2O_3+P_2O_5+Li_2O)$ | No more than 93. |
| $(TiO_2+ZrO_2)$ | 2–6. | wherein the ratio of $(CaO+MgO+ZnO+NaO+B_2O_3)$ to $Li_2O$ is less than 2.4 and the ratio of $SiO_2$ to $Al_2O_3$ is no more than 3.8.

6. The one-piece, light-weight telescope mirror blank as defined in claim 5 wherein said $SiO_2$ to $Al_2O_3$ ratio in said thermal crystallizable glass composition is no more than 3.3.

7. The one-piece, light-weight telescope mirror blank as defined in claim 5 wherein the amount of said $$(TiO_2+ZrO_2)$$

in said thermal crystallizable glass composition is no more than about 3 weight percent and said $TiO_2$ is present in an amount of from about 1 to about 1.5 weight percent.

8. The one-piece, lightweight telescope mirror blank as defined in claim 1 wherein the coefficient of lineal thermal expansion of the mirror blank is from about minus $$10 \times 10^{-7}$$

to about $10 \times 10^{-7}$.

9. The one-piece lightweight telescope mirror blank as defined in claim 8 wherein the glass-ceramic contains as predominant crystalline species lithium-containing crystalline phases selected from the group consisting of beta-eucryptite, beta-spodumene, and mixtures thereof, said ceramic containing a multitude of such crystalline species in random orientation throughout such ceramic and disposed in a glassy matrix, substantially all of the crystals of said ceramic being of a diameter less than ⅓ micron measured along the largest lineal dimension of the crystals.

10. A one-piece, lightweight, telescope mirror blank as set forth in claim 9 which further contains an axial opening in one of said surfaces which opening is of substantially larger cross-sectional area than the said plurality of openings.

11. A one-piece, lightweight, transparent telescope mirror blank consisting essentially of one integral shaped mass of transparent, low-expansion at least partially crystallized glass ceramic, and having a pair of oppositely disposed face surfaces and a plurality of separate cavities disposed between said surfaces, the volume between adjacent cavities being occupied by the mass of said at least partially crystallized glass ceramic, one of said face surfaces being provided with a plurality of openings, each of said openings being disposed opposite to and communicating with one of said cavities, the cross-sectional area of said openings being smaller than the cross-sectional area of said cavity, each of said cavities being provided with one of said openings, the bottom of each of said cavities opposite each of said openings being equally spaced from and substantially parallel to the other surface of said mirror blank.

12. A one-piece, lightweight, telescope mirror blank consisting essentially of one integral shaped mass of a transparent low expansion at least partially crystallized glass ceramic, said mirror blank having a pair of oppositely disposed face surfaces and a plurality of separate cavities disposed between said surfaces, the volume between adjacent cavities being occupied by the mass of said at least partially crystallized glass ceramic, one of said face surfaces being provided with a plurality of openings, each of said openings being disposed above and communicating with one of said cavities, each of said openings being smaller in cross-sectional area than the cross-sectional area of said cavity.

13. A one-piece lightweight telescope mirror blank as defined in claim 2 wherein the glass ceramic contains as predominant crystalline species lithium-containing crystalline phases selected from the group consisting of beta-eucryptite, beta-spodumene, and mixtures thereof, said ceramic containing a multitude of such crystalline species in random orientation throughout such ceramic and dispersed in a glassy matrix, substantially all of the crystals of said ceramic being of a diameter less than ⅓ micron measured along the largest lineal dimension of the crystals.

References Cited

UNITED STATES PATENTS

| | | | |
|---|---|---|---|
| 2,152,394 | 3/1939 | Veeder | 350—310 |
| 2,988,456 | 6/1961 | Fairbanks et al. | 117—35 |
| 3,157,522 | 11/1964 | Stookey | 106—52 |
| 3,241,985 | 3/1966 | Kuwayama | 106—39 |
| 3,246,972 | 4/1966 | Smith | 65—18 |
| 3,325,266 | 6/1967 | Stong | 65—33 |

FOREIGN PATENTS

| | | |
|---|---|---|
| 1,268,097 | 6/1961 | France. |
| 1,313,114 | 11/1962 | France. |

ROBERT F. BURNETT, Primary Examiner

W. A. POWELL, Assistant Examiner

U.S. Cl. X.R.

65—33, 60, 66, 365; 117—35; 161—117; 350—296

PO-1050
(5/69)

UNITED STATES PATENT OFFICE
CERTIFICATE OF CORRECTION

Patent No. 3,484,328               Dated   December 16, 1969

Inventor(s) L.M. Austin and Robert R. Denman, T.P.O'Donnell and Frank Veres

It is certified that error appears in the above-identified patent and that said Letters Patent are hereby corrected as shown below:

Column 8, line 56, delete "56-58" and insert therefor
--56-68--

SIGNED AND
SEALED
JUL 21 1970

(SEAL)
Attest:

Edward M. Fletcher, Jr.
Attesting Officer

WILLIAM E. SCHUYLER, JR.
Commissioner of Patents